United States Patent
Lee (10) Patent No.: US 7,116,393 B2
(45) Date of Patent: Oct. 3, 2006

(54) ARRAY SUBSTRATE FOR IN-PLANE SWITCHING MODE LIQUID CRYSTAL DISPLAY DEVICE AND METHOD FOR FABRICATING THE SAME

(75) Inventor: Jae-Kyun Lee, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 67 days.

(21) Appl. No.: 10/442,947

(22) Filed: May 22, 2003

(65) Prior Publication Data

US 2004/0125300 A1 Jul. 1, 2004

(30) Foreign Application Priority Data

Dec. 31, 2002 (KR) .................. 10-2002-0088081

(51) Int. Cl.
*G02F 1/13* (2006.01)
(52) U.S. Cl. ....................................... 349/192; 349/141
(58) Field of Classification Search ................ 349/141, 349/54, 192, 55
See application file for complete search history.

(56) References Cited

U.S. PATENT DOCUMENTS

| | | | |
|---|---|---|---|
| 5,598,285 A | 1/1997 | Kondo et al. | |
| 5,838,037 A | 11/1998 | Masutani et al. | |
| 5,946,060 A | 8/1999 | Nishiki et al. | |
| 5,990,987 A | 11/1999 | Tanaka | |
| 6,028,653 A | 2/2000 | Nishida | |
| 6,097,454 A | 8/2000 | Zhang et al. | |
| 6,266,166 B1 | 7/2001 | Katsumata et al. | |
| 6,614,494 B1* | 9/2003 | Kawai et al. ................ | 349/54 |
| 6,657,699 B1* | 12/2003 | Matsumoto ................ | 349/156 |
| 2001/0043304 A1* | 11/2001 | Matsumoto ................. | 349/141 |
| 2002/0018166 A1* | 2/2002 | Matsumoto et al. ........ | 349/141 |
| 2002/0047977 A1* | 4/2002 | Lee ............................. | 349/141 |
| 2003/0002000 A1* | 1/2003 | Watanabe ................... | 349/141 |

(Continued)

FOREIGN PATENT DOCUMENTS

JP 9-005764 1/1997

(Continued)

OTHER PUBLICATIONS

Kiefer, et al., "In-Plane Switching of Nematic Liquid Crystals," *Japan Display*, 1992, pp. 547-550.

(Continued)

*Primary Examiner*—James A. Dudek
(74) *Attorney, Agent, or Firm*—McKenna Long & Aldridge LLP (57) ABSTRACT

An array substrate device for a liquid crystal display device includes a substrate, a gate line extending along a first direction on the substrate, a data line extending along a second direction substantially perpendicular to the first direction on the substrate, a pixel region defined by a crossing of the gate and data lines, a common line extending along the first direction and spaced apart from the gate line, a common electrode having a plurality of first portions extended along the second direction from the common line to the pixel region, wherein the extended portion of the common electrode adjacent to the data line includes first and second extensions overlapping portions of the data line, a thin film transistor on the substrate at a crossing portion of the gate and data lines, the thin film transistor including source and drain electrodes, a pixel electrode extended from the drain electrode to the pixel region, and an auxiliary electrode connected to the extended portion of the common electrode adjacent to the data line.

43 Claims, 8 Drawing Sheets

U.S. PATENT DOCUMENTS

2003/0086045 A1* 5/2003 Ono et al. .................. 349/141
2003/0133068 A1* 7/2003 Suzuki et al. ............... 349/141

FOREIGN PATENT DOCUMENTS

JP          9-073101        3/1997
JP          2000-292803 A  10/2000

OTHER PUBLICATIONS

Oh-e, et al., "Principles and Characteristics of Electro-Optical Behavior with In-Plane Switching Mode," *Asia Display*, 1995, pp. 577-580.

Ohta, et al., "Development of Super-TFT-LCDs with In-Plane Switching Display Mode," *Asia Display*, 1995, pp. 707-710.

Matsumoto, et al., "Display Characteristics of In-Plane Switching (IPS) LCDs and a Wide-Viewing-Angle 14.5-in. IPS TFT-LCD," *Euro Display*, 1996, pp. 445-448.

Wakemoto, et al., "38.1: An Advanced In-Plane-Switching Mode TFT-LCD," *SID 97 Digest*, 1997, pp. 929-932.

Lee, et al., "High-Transmittance, Wide-Viewing-Angle Nematic Liquid Crystal Display Controlled by Fringe-Field Switching," *Asia Display*, 1998, pp. 371-374.

\* cited by examiner

ARRAY SUBSTRATE FOR IN-PLANE SWITCHING MODE LIQUID CRYSTAL DISPLAY DEVICE AND METHOD FOR FABRICATING THE SAME

The present invention claims the benefit of Korean Patent Application No. 2002-88081 filed in Korea on Dec. 31, 2002, which is hereby incorporated by reference.

BACKGROUND OF THE INVENTION

1. Field of the Invention

The present invention relates to a liquid crystal display device and a method for fabricating the same, and more particularly, to an array substrate for in-plane switching (IPS) mode liquid crystal display device and a method for fabricating the same.

2. Discussion of the Related Art

In general, a liquid crystal display (LCD) device uses optical anisotropy and polarization properties of liquid crystal molecules to create images, and the liquid crystal molecules have a natural alignment order. In addition, the alignment order of the liquid crystal molecules can be altered by an electric field, such that the alignment order of the liquid crystal molecules changes as the direction of the electric field being applied to the liquid crystal molecules changes. Accordingly, by applying an electric field to the liquid crystal molecules, light incident on the liquid crystal molecules is then refracted by the changes in the alignment order of the liquid crystal molecules to thereby display images in the LCD device.

Further, thin film transistors and pixel electrodes are generally employed to create the electric field being applied to the liquid crystal molecules. The thin film transistors and the pixel electrodes are commonly arranged in a matrix in a LCD device, often referred to as an active matrix LCD device, because the matrix arrangement controls the size of a pixel to thereby provide a high resolution in display images and how quickly each pixel changes to thereby provide superiority in displaying moving images.

Figure 1:
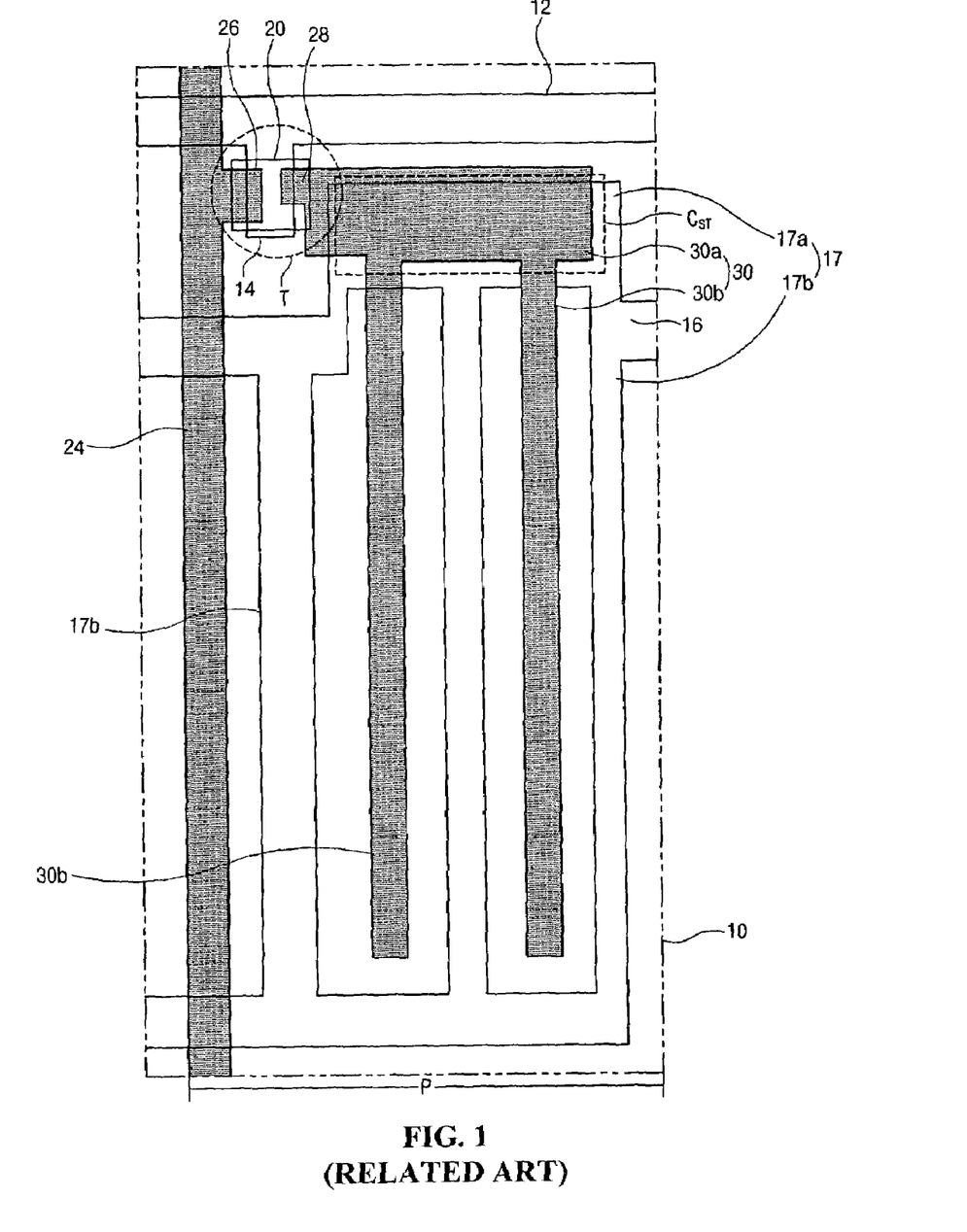
FIG. 1 is a planar view of an array substrate for an IPS mode LCD device according to related art.

FIG. 1 is a planar view of an array substrate for an IPS mode LCD device according to related art. In FIG. 1, a gate line 12 and a common line 16 are formed spaced apart from each other along a first direction on an array substrate 10. A data line 24 is formed along a second direction perpendicular to the first direction and a pixel region P is defined by the gate and data lines 12 and 14 crossing with each other. Also a pixel electrode 30 and a thin film transistor T are formed within the pixel region P on the array substrate 10. The thin film transistor T is switched by signals of the gate line 12 to transfer signals of the data line 14 to the pixel electrode 30. In particular, the thin film transistor T includes a gate electrode 14 extended from the gate line 12, an active layer 20 covering the gate electrode 14, and source and drain electrodes 26 and 28 spaced apart from each other. The source and drain electrodes 26 and 28 are formed over the active layer 20, such that the source electrode 26 is extended from the data line 24 and the drain electrode 28 connects to the pixel electrode 30. Also the pixel electrode 30 includes a horizontal portion 30a extended from the drain electrode 28, and a plurality of vertical portions 30b extended from the horizontal portion 30a.

In addition, a common electrode 17 is formed within the pixel region P and connects to the common line 16 on the array substrate 10. The common electrode 17 is parallel to the pixel electrode 30. Further, the common electrode 17 includes a horizontal portion 17a and a plurality of vertical portions 17b, which vertically extend from the horizontal portion 17a and the common line 16. Moreover, the vertical portions 17b of the common electrode 17 interpose between the plurality of vertical portions 30b of the pixel electrode 30. The array substrate 10 also includes a storage capacitor $C_{ST}$ formed by the overlapping of the horizontal portion 17a of the common electrode 17 and the horizontal portion 30a of the pixel electrode 30, such that the storage capacitor $C_{ST}$ is electrically connected to a liquid crystal capacitor $C_{LC}$ (not shown) in the pixel region P. In particular, the horizontal portion 17a of the common electrode 17 serves as a first storage electrode of the storage capacitor $C_{ST}$, and the horizontal portion 30a of the pixel electrode 30 serves as a second storage electrode of the storage capacitor $C_{ST}$.

According to the related art, the vertical portion 17b of the common electrode 17 adjacent to the data line 24 has a larger width than the other vertical portions 17b in order to protect liquid crystal molecule materials adjacent to the data line 24 from being affected by signals flowing through the data line 24. However, because the data line 24 crosses over the gate line 12 and the common line 16, a deposition state at portions near the data line 24 is unstable and the data line 24 may be easily broken.

SUMMARY OF THE INVENTION

Accordingly, the present invention is directed to an array substrate for in-plane switching mode liquid crystal display device and a method of fabricating the same that substantially obviates one or more of problems due to limitations and disadvantages of the related art.

An advantage of the present invention is to provide an array substrate for in-plane switching (IPS) mode liquid crystal display (LCD) device, wherein a vertical portion of the common electrode adjacent to a data line has extensions crossing the data line and an auxiliary electrode is connected to the vertical portion of the common electrode to protect liquid crystal from being affected by signals of the data line and facilitate a repair work when the data line is broken.

Another advantage of the present invention is to provide a method for manufacturing the array substrate for the in-plane switching (IPS) mode liquid crystal display (LCD) device, wherein a vertical portion of the common electrode adjacent to a data line has extensions crossing the data line and an auxiliary electrode is connected to the vertical portion of the common electrode to protect liquid crystal from being affected by signals of the data line and facilitate a repair work when the data line is broken.

Another advantage of the present invention is to provide a method for repairing the data line of the in-plane switching (IPS) mode liquid crystal display (LCD) device, wherein the extension of the vertical portion of the common electrode is connected to the broken data line and then upper and lower portions of the vertical portion of the common electrode are cut.

Another advantage of the present invention is to provide an array substrate for an in-plane switching (IPS) mode liquid crystal display (LCD) device, wherein an auxiliary is extended from a common line and has extensions crossing a data line to protect liquid crystal from being affected by signals of the data line and facilitate a repair work when the data line is broken.

Another advantage of the present invention is to provide a method for manufacturing the array substrate for the in-plane switching (IPS) mode liquid crystal display (LCD) device, wherein an auxiliary is extended from a common line and has extensions crossing a data line to protect liquid crystal from being affected by signals of the data line and facilitate a repair work when the data line is broken.

Another advantage of the present invention is to provide a method for repairing the data line of the in-plane switching (IPS) mode liquid crystal display (LCD) device, wherein the extension of the auxiliary electrode is connected to the broken data line and then upper and lower portions of the auxiliary electrode are cut.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the array substrate device for a liquid crystal display device includes a substrate, a gate line extending along a first direction on the substrate, a data line extending along a second direction substantially perpendicular to the first direction on the substrate, a pixel region defined by a crossing of the gate and data lines, a common line extending along the first direction and spaced apart from the gate line, a common electrode having a plurality of first portions extended along the second direction from the common line to the pixel region, wherein the extended portion of the common electrode adjacent to the data line includes first and second extensions overlapping portions of the data line, a thin film transistor on the substrate at a crossing portion of the gate and data lines, the thin film transistor including source and drain electrodes, a pixel electrode extended from the drain electrode to the pixel region, and an auxiliary electrode connected to the extended portion of the common electrode adjacent to the data line.

In another aspect, the method for fabricating an array substrate for a liquid crystal display device includes forming a gate line extending along a first direction on a substrate, forming a data line extending along a second direction on the substrate, thereby defining a pixel region by a crossing of the gate and data lines, forming a common line extending along the first direction and spaced apart from the gate line, forming a common electrode having a plurality of first portions extended along the second direction from the common line to the pixel region, wherein the extended portion of the common electrode adjacent to the data line includes first and second extensions overlapping portions of the data line, forming a thin film transistor on the substrate at a crossing portion of the gate and data lines, wherein the thin film transistor includes source and drain electrodes, forming a pixel electrode extended from the drain electrode to the pixel region, and forming an auxiliary electrode connected to the extended portion of the common electrode adjacent to the data line.

In another aspect, the array substrate device for a liquid crystal display device includes a substrate, a gate line extending along a first direction on the substrate, a data line extending along a second direction substantially perpendicular to the first direction on the substrate, a pixel region defined by a crossing of the gate and data lines, a common line extending along the first direction and spaced apart from the gate line, a common electrode having a plurality of first portions extended along the second direction from the common line to the pixel region, a thin film transistor on the substrate at a crossing portion of the gate and data lines, the thin film transistor including source and drain electrodes, a pixel electrode on the substrate extended from the drain electrode to the pixel region, and an auxiliary electrode extended from the common line to a space between the data line and the extended portion of the common electrode adjacent to the data line, the auxiliary electrode having first and second extensions crossing the data line.

In another aspect, the method for fabricating an array substrate for a liquid crystal display device includes forming a gate line extending along a first direction on a substrate, forming a data line extending along a second direction on the substrate, thereby defining a pixel region by a crossing of the gate and data lines, forming a common line extending along the first direction and spaced apart from the gate line, forming a common electrode having a plurality of portions extended from the common line to the pixel region, forming a thin film transistor at a crossing portion of the gate and data lines, forming a pixel electrode extended from the drain electrode to the pixel region, and forming an auxiliary electrode extended from the common line to a space between the data line and the portion of the common electrode adjacent to the data line, the auxiliary electrode having first and second extensions crossing the data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings.

Figure 2:
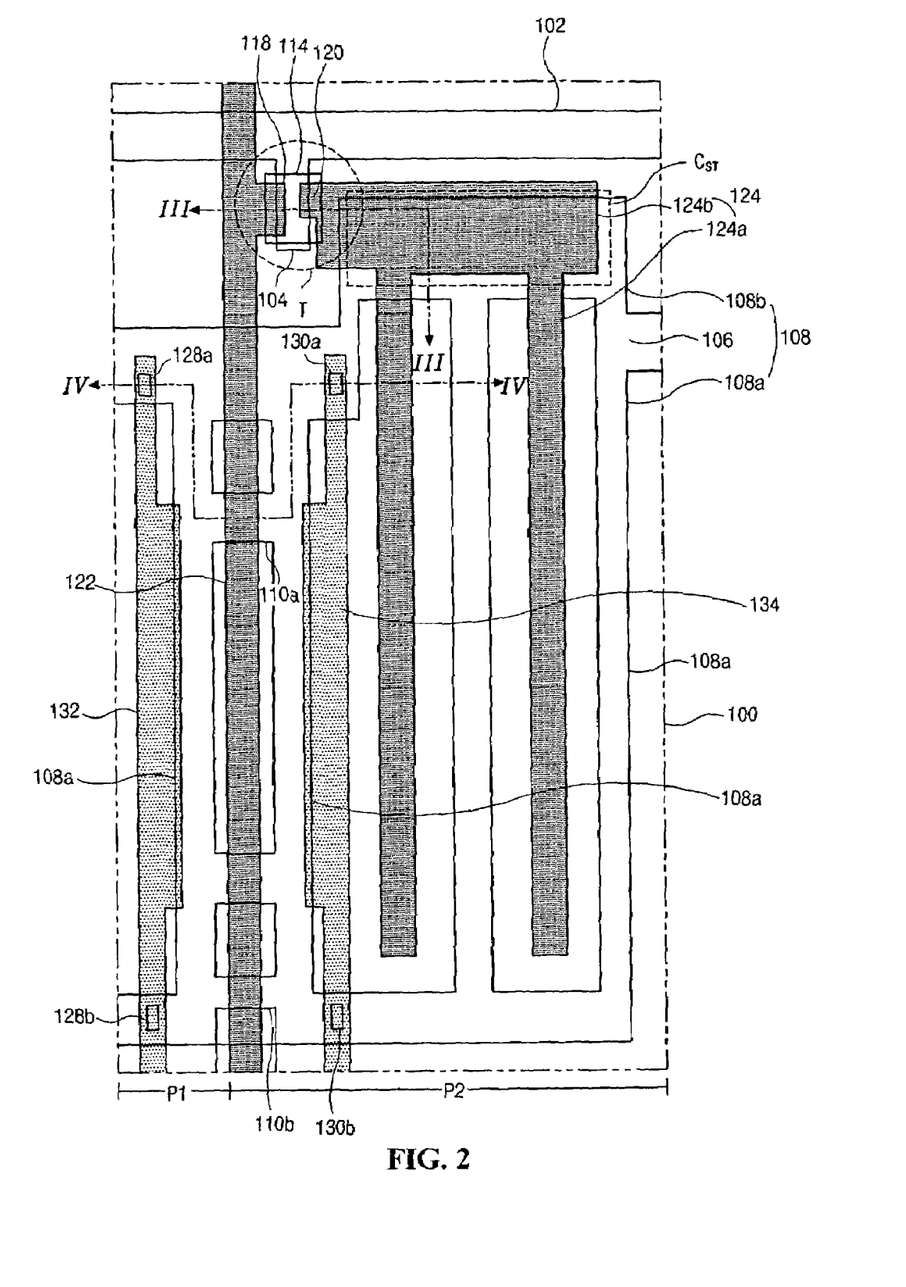
FIG. 2 is a planar view of an exemplary array substrate for an in-plane switching (IPS) mode liquid crystal display (LCD) device according to the present invention.

FIG. 2 is a planar view of an exemplary array substrate for an in-plane switching (IPS) mode liquid crystal display (LCD) device according to the present invention. In FIG. 2, a gate line 102 and a common line 106 may be formed spaced apart from each other along a first direction on an array substrate 100. A data line 122 also may be formed along a second direction perpendicular to the first direction and first and second pixel regions P1 and P2 may be defined by the gate and data lines 102 and 122 crossing with each other. A pixel electrode 124 and a thin film transistor T may be formed within the second pixel region P2 on the array substrate 100. The thin film transistor T may be switched by signals of the gate line 102 to transfer signals of the data lines 122 to the pixel electrode 124. In addition, the thin film transistor T may include a gate electrode 104 extended from the gate line 102, an active layer 114 covering the gate electrode 104, and source and drain electrodes 118 and 120 spaced apart from each other. The source and drain electrodes 118 and 120 may be formed over the active layer 114, such that the source electrode 118 may extend from the data line 102, and the drain electrode 120 may connect to the pixel electrode 124.

In addition, a common electrode 108 may be formed within the first and second pixel regions P1 and P2, and may connect to the common line 106. The common electrode 108 may be generally parallel to the pixel electrode 124. Also the common electrode 108 may include at least a horizontal portion 108b and a plurality of vertical portions 108a, which vertically extend from the horizontal portion 108b and the common line 106 in the pixel regions P1 and P2. Further, the pixel electrode 124 may include a horizontal portion 124b extended from the drain electrode 120 to a top portion of the horizontal portion 108b of the common electrode, and a plurality of vertical portions 124a extended from the horizontal portion 124b in the pixel regions P1 and P2. Moreover, the vertical portions 124a of the pixel electrode 124 may interpose between the vertical portions 108a of the common electrode 108.

An insulating layer (not shown) may be disposed between the horizontal portion 108b of the common electrode 108 and the horizontal portion 124b of the pixel electrode 124, thereby forming a storage capacitor $C_{ST}$. In addition, the horizontal portion 124b of the pixel electrode 124 may serve as a first storage electrode of the storage capacitor $C_{ST}$, and the horizontal portion 108b of the common electrode 108 may serve as a second storage electrode of the storage capacitor $C_{ST}$. Further, the array substrate 100 may include auxiliary electrodes 132 and 134 electrically connected to the two vertical portions 108a of the common electrode 108 immediately adjacent to the data line 122 in the pixel regions P1 and P2, respectively. The auxiliary electrodes 132 and 134 (shown as dotted areas) may be formed by patterning a transparent conductive material connected to at least the vertical portions 108a of the common electrode 108 immediately adjacent to the data line 122.

Moreover, the array substrate 100 may include first and second connectors 110a and 1110b crossing the data line 122 for connecting the vertical portion 108a of the common electrode 108 immediately adjacent to the data line 122 in the first pixel region P1 to the vertical portion 108a of the common electrode 108 immediately adjacent to the data line 122 in the second pixel region P2. Accordingly, if a breakage in the data line 122 occurs, the first and second connectors 110a and 110b then may be welded to the broken data line 122 and the vertical portions 108a of the common electrode 108 immediately adjacent to the broken data line 122 may be cut to disconnect from the horizontal portion 108b of the common electrode 108. Thus, the vertical portions 108a of the common electrode 108 immediately adjacent to the broken data line 122 may become a repair line and may function as the data line 122, while the auxiliary electrodes 132 and 134 may function as the vertical portions 108a of the common electrode 108 immediately adjacent to a data line. Furthermore, during a normal operation, i.e., no breakage in the data line 122, the auxiliary electrodes 132 and 134 cooperate with the vertical portions 108a of the common electrode 108 to enhance the protection of liquid crystal molecule materials adjacent to the data line 122 from being affected by signals of the data line 122.

Figure 3A:
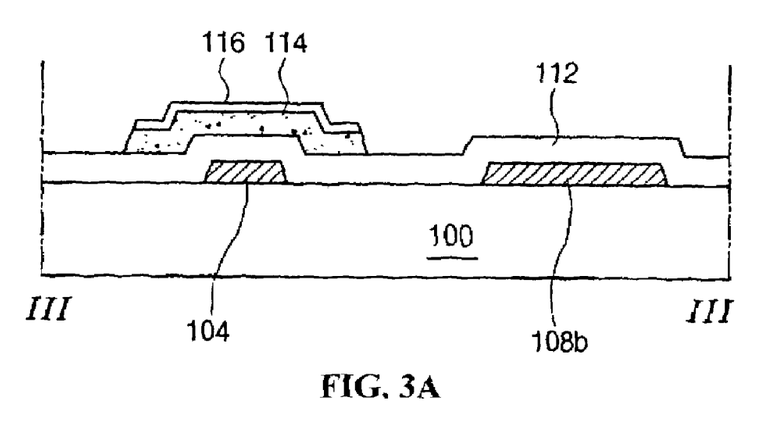
FIGS. 3A to 3B are cross-sectional views of the exemplary array substrate in FIG. 2 along III—III' according to the present invention.
Figure 3B:
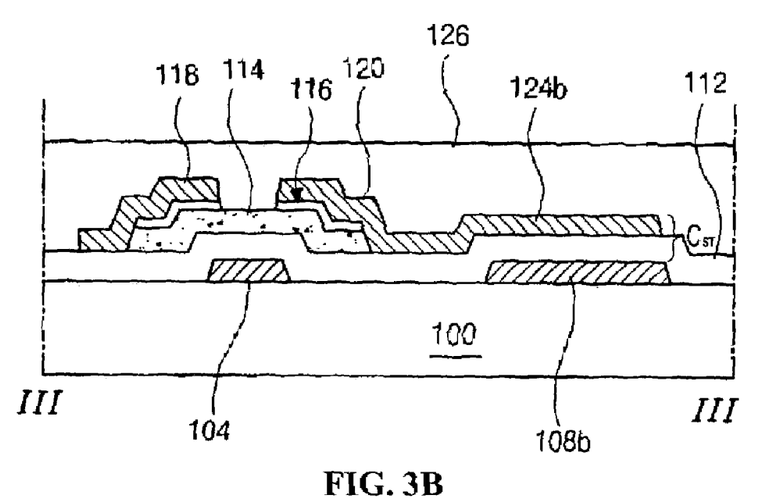
Figure 4A:
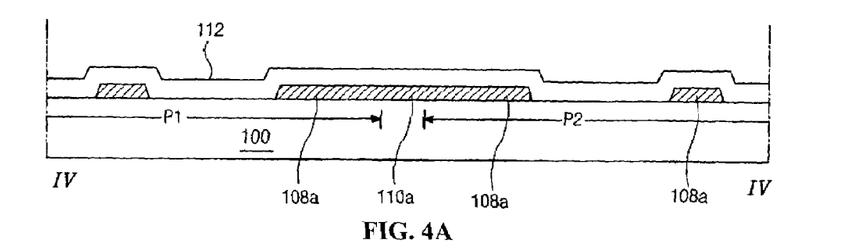
FIGS. 4A to 4C are cross-sectional views of the exemplary array substrate in FIG. 2 along IV—IV' according to the present invention.
Figure 4B:
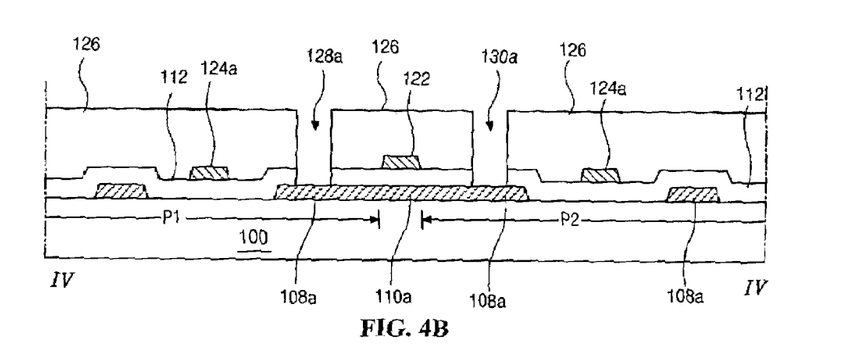
Figure 4C:
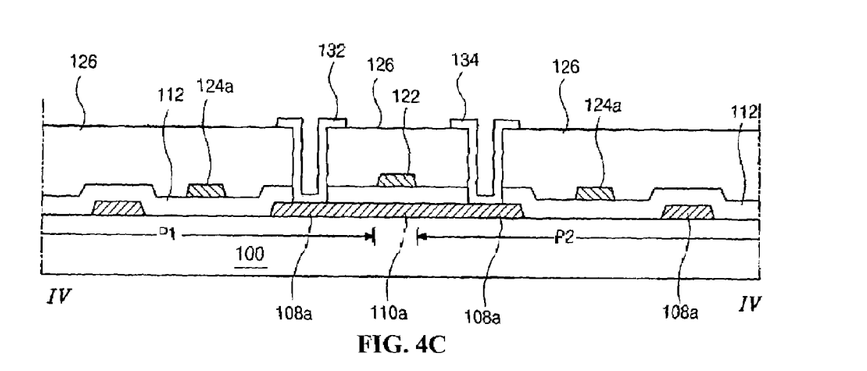

FIGS. 3A to 3B are cross-sectional views of the exemplary array substrate in FIG. 2 along III—III' according to the present invention, and FIGS. 4A to 4C are cross-sectional views of the exemplary array substrate in FIG. 2 along IV—IV' according to the present invention. In FIGS. 3A and 4A, a first conductive material layer may be deposited on the array substrate 100. The first conductive material layer may include one of aluminum (Al), aluminum alloys (AlNd), chromium (Cr), tungsten (W), molybdenum (Mo), and tantalum (Ta). In addition, the first conductive material layer may be patterned to simultaneously or sequentially form at least the gate electrode 104, the common line 106 (in FIG. 2), the common electrode 108 including the horizontal portion 108b and the vertical portions 108a, the connector 110a and the connector 110b (in FIG. 2). In particular, the gate electrode 104 may extend from the gate line 102, and the common line 106 may be spaced apart and be substantially parallel to the gate line 102. Further, the plurality of vertical portions 108a may extend vertically from the horizontal portion 108b and the common line 106 in both the pixel regions P1 and P2. Moreover, the two vertical portions 108a immediately adjacent to the data line 122 in the pixel regions P1 and P2 may interconnect to each other by the first and second connectors 110a and 10b at the upper and lower portions of the two vertical portions 108b.

In addition, a gate insulating layer 112 may be formed on the array substrate 100 covering at least the gate electrode 104, the vertical portions 108a and horizontal portion 108b of the common electrode 108, and the connector 110a. The gate insulating layer 112 may be formed by depositing an inorganic insulating material on the array substrate 100, and the inorganic insulating material may include one of silicon nitride ($SiN_x$) and silicon oxide ($SiO_2$). Also the active layer 114 and an ohmic contact layer 116 may be formed on the gate insulating layer 112 directly above the gate electrode 104 by sequentially depositing amorphous silicon (a-Si:H) and impurity-doped amorphous silicon ($n^+$a-Si:H) on the gate insulating layer 112 and then patterning the deposited materials.

In FIGS. 3B and 4B, a second conductive material layer may be deposited on the array substrate 100. The second conductive material layer may include one of aluminum (Al), aluminum alloys (AlNd), chromium (Cr), tungsten (W), molybdenum (Mo), and tantalum (Ta). The second conductive material layer may include the same material as the first conductive material layer. In addition, the second conductive material layer may be patterned to simultaneously or sequentially form at least the data line 122, the pixel electrode 124 including the vertical portions 124a and the horizontal portion 124b, and the source and drain electrodes 118 and 120. In particular, the source and drain electrodes 118 and 120 may be spaced apart from each other on the ohmic contact layer 116, and a portion of the ohmic contact layer 116 may also be etched to expose a portion of the active layer 114. Further, the source electrode 118 may connect to the data line 122, and the drain electrode 120 may connect to the horizontal portion 124b of the pixel electrode 124. Also, the horizontal portion 124b of the pixel electrode 124 may extend to cover a portion of the horizontal portion 108b of the common electrode 108, such that the horizontal portion 124b of the pixel electrode 124, the horizontal portion 108b of the common electrode 108, and the gate insulating layer 112 disposed therebetween may form the storage capacitor $C_{ST}$.

Further, the data line 122 may cross the first connector 110a and the second connector 10b (in FIG. 2), and the vertical portions 124a of the pixel electrode 124 may extend vertically from the horizontal portion 124b. In particular, the vertical portions 124a of the pixel electrode 124 may interpose between the vertical portions 108a of the common electrode 108.

In addition, a passivation layer 126 may be formed on the array substrate 100 covering the source and drain electrodes 118 and 120, the exposed portion of the active layer 114, the horizontal portion 124b of the pixel electrode 124, the vertical portions 124a of the pixel electrode 124, and the data line 122. The passivation layer 126 may function as a second insulating layer of the array substrate 100. Moreover, the passivation layer 126 may be formed by depositing an organic insulating material on the array substrate 100, and the organic insulating material may include one of benzocyclobutene (BCB) and acrylic resin. Then, portions of the passivation layer 126 may be patterned to form first, second, third and fourth contact holes 128a, 128b, 130a and 130b (in FIG. 2) exposing upper and lower portions of the vertical portion 108a immediately adjacent to the data line 122.

In FIG. 4C, a transparent conductive material layer may be deposited on the array substrate 100. The transparent conductive material layer may include one of indium tin oxide (ITO) and indium zinc oxide (IZO). In addition, the transparent conductive material layer may be patterned to form the auxiliary electrodes 132 and 134. In particular, the auxiliary electrode 132 may connect to the upper and lower portions of the vertical portion 108a immediately adjacent to the data line 122 within the first pixel region P1 via the first and second contact holes 128a and 128b. Also, the auxiliary electrode 134 may connect to the upper and lower portions of the vertical portion 108a immediately adjacent to the data line 122 within the second pixel region P2 via the third and fourth contact holes 130a and 130b. The auxiliary electrodes 132 and 134 may overlap portions of the vertical portions 108a of the common electrode 108 (in FIG. 2) and may function as part of the common electrode 108 when the data line 122 is broken as mentioned before.

Accordingly, the array substrate 100 may include the two vertical portions 108a of the common electrode 108 immediately adjacent to the data line 122, which could function as a repair line when a malfunction occurs in the data line, e.g., a breakage in the data line 122. In particular, the two vertical portions 108a of the common electrode 108 immediately adjacent to the data line 122 may function as the repair line when the upper and lower portions of the vertical portions 108a are cut to electrically disconnect the two vertical portions 108a from the common lien 106. Therefore, a breakage in the data line 122 can be repaired easily, and a LCD device employing the array substrate according to the present invention would provide a high quality of images.

Figure 5:
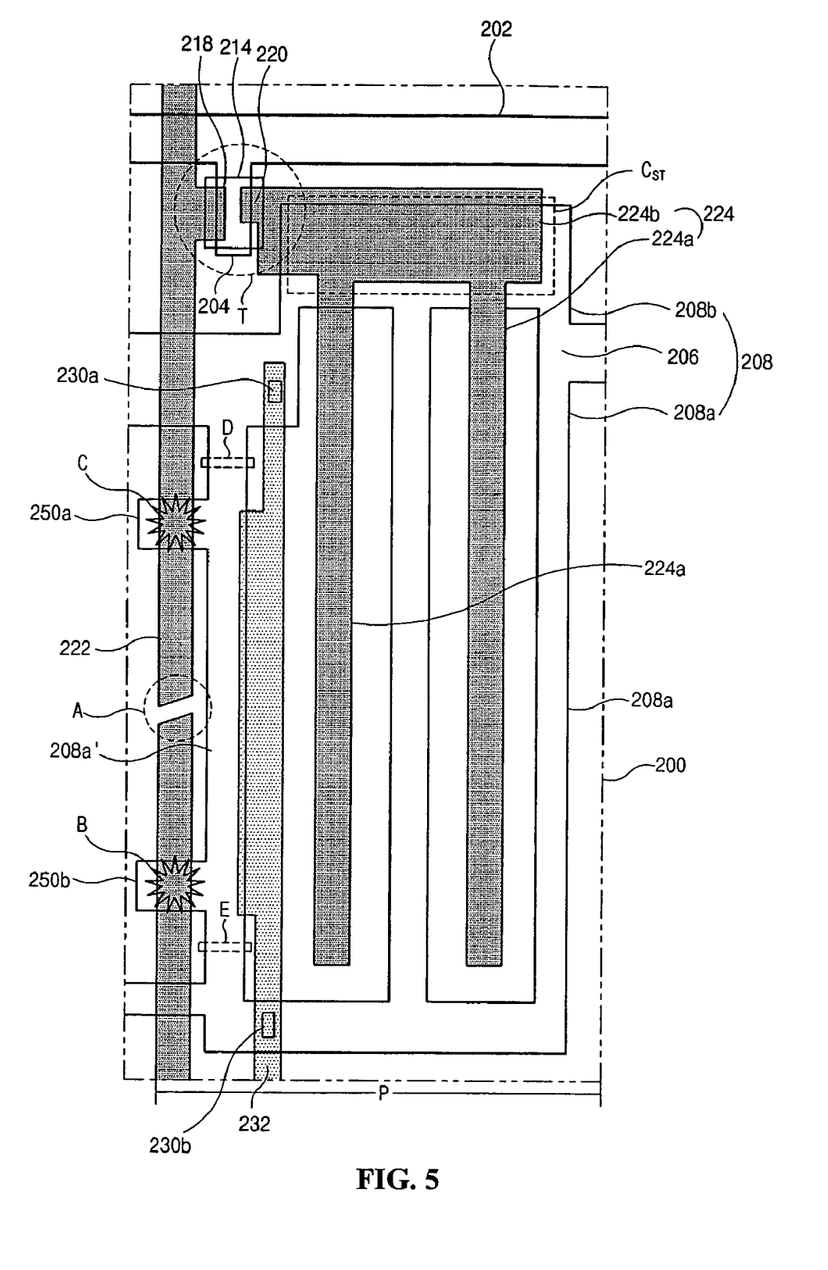
FIG. 5 is a planar view of another exemplary array substrate for an in-plane switching (IPS) mode liquid crystal display (LCD) device according to the present invention.

FIG. 5 is a planar view of another exemplary array substrate for an in-plane switching (IPS) mode liquid crystal display (LCD) device according to the present invention. In FIG. 5, a gate line 202 and a common line 206 may be formed spaced apart from each other along a first direction on an array substrate 200. A data line 222 also may be formed along a second direction perpendicular to the first direction, and a pixel region P may be defined by the gate and data lines 202 and 222 crossing with each other. A pixel electrode 224 and a thin film transistor T may be formed within the pixel region P on the array substrate 200. The thin film transistor T may be switched by signals of the gate line 202 to transfer signals of the data line 222 to the pixel electrode 224. In addition, the thin film transistor T may include a gate electrode 204 extended from the gate line 202, an active layer 214 covering the gate electrode 204, and source and drain electrodes 218 and 220 spaced apart from each other. The source and drain electrodes 218 and 220 may be formed over the active layer 214, such that the source electrode 218 may extend from the data line 222, and the drain electrode 220 may connect to the pixel electrode 224.

In addition, a common electrode 208 may be formed within the pixel region P and may connect to the common line 206. The common electrode 208 may include at least a horizontal portion 208b and a plurality of vertical portions 208a, which vertically extend from the horizontal portion 208b and the common line 206 in the pixel region P. Further, the pixel electrode 224 may include a horizontal portion 224b extended from the drain electrode 220 to a top portion of the horizontal portion 208b of the common electrode 208, and a plurality of vertical portions 224a vertically extended from the horizontal portion 224b in the pixel region P. Moreover, the vertical portions 224a of the pixel electrode 224 may interpose between the vertical portions 208a of the common electrode 208.

An insulating layer (not shown) may be disposed between the horizontal portion 208b of the common electrode 208 and the horizontal portion 224b of the pixel electrode 224 thereby forming a storage capacitor $C_{ST}$. In addition, the horizontal portion 224b of the pixel electrode 224 may serve as a first storage electrode of the storage capacitor $C_{ST}$, and the horizontal portion 208b of the common electrode 208 may serve as a second storage electrode of the storage capacitor $C_{ST}$. Further, the array substrate 200 may include an auxiliary electrode 232 electrically connected to the vertical portion 208a' of the common electrode 208 immediately adjacent to the data line 222. The auxiliary electrode 232 may include contact holes 230a and 230b exposing upper and lower portions of the vertical portion 208a' of the common electrode 208 immediately adjacent to the data line 222. Moreover, the vertical portion 208a' of the common electrode 208 immediately adjacent to the data line 222 may include first and second projected patterns 250a and 250b crossing the data line 222.

Accordingly, if a malfunction occurs in the data line 222, e.g., a breakage at a portion A of the data line 222, the first and second projected patterns 250a and 250b may be welded to connect to the data line 222 at portions B and C. In addition, portions D and E of the vertical portion 208a' of the common electrode 208 immediately adjacent to the data line 222 may be cut, such that the vertical portion 208a' of the common electrode 208 immediately adjacent to the data line 222 may become a repair line and function as the data line 222. Moreover, this repair process would be conducted in a short amount of time and an LCD device employing the array substrate according to the present invention would provide a high quality of images.

Figure 6:
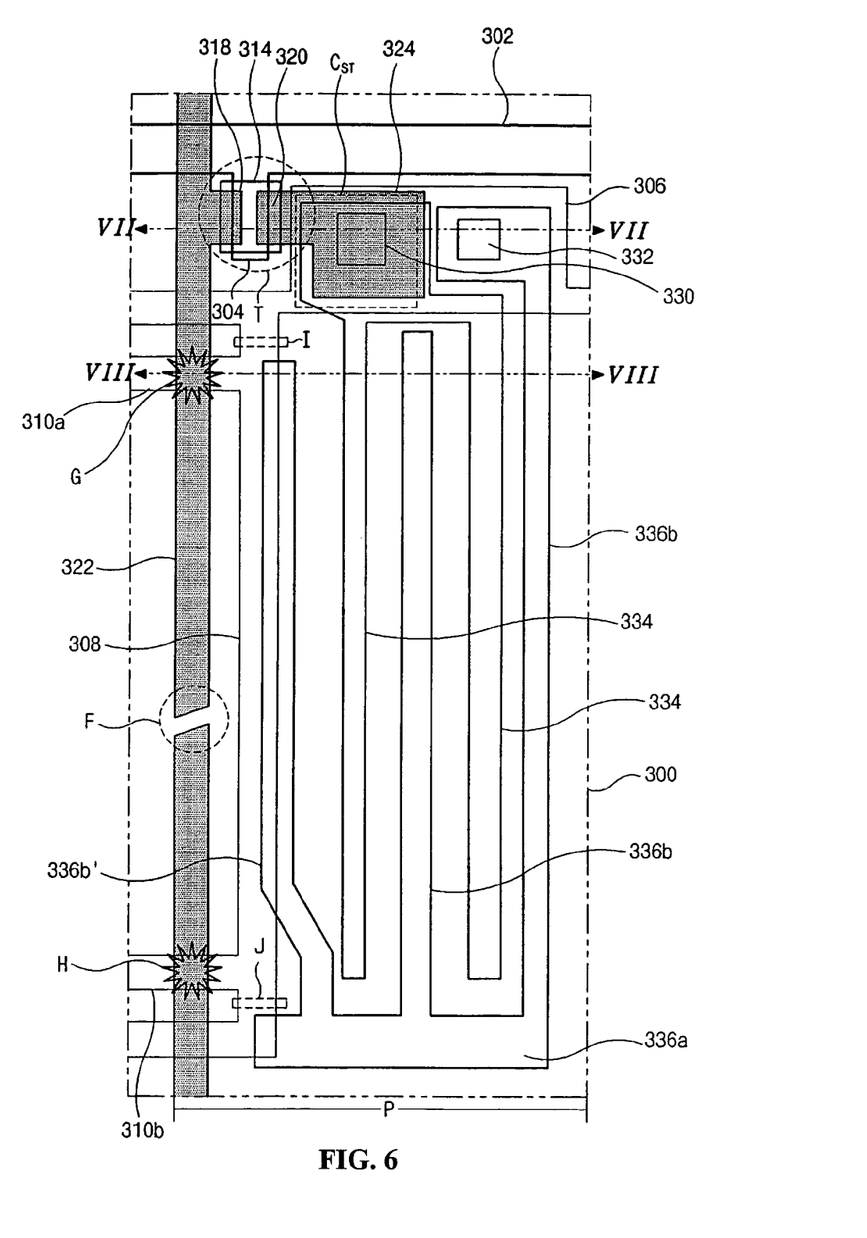
FIG. 6 is a planar view of another exemplary array substrate for an in-plane switching (IPS) mode liquid crystal display (LCD) device according to the present invention.

FIG. 6 is a planar view of another exemplary array substrate for an in-plane switching (IPS) mode liquid crystal display (LCD) device according to the present invention. In FIG. 6, a gate line 302 and a common line 306 may be formed spaced apart from each other along a first direction on an array substrate 300. The common line 306 may include a common line contact hole 332 exposing a portion of the common line 306. A data line 322 also may be formed along a second direction perpendicular to the first direction, and a pixel region P may be defined by the gate and data lines 302 and 322 crossing each other. In addition, a thin film transistor T may be formed within the pixel region P on the array substrate 300. The thin film transistor T may include a gate electrode 304 extended from the gate line 302, an active layer 314 covering the gate electrode 304, and source and drain electrodes 318 and 320 spaced apart from each other. The source and drain electrodes 318 and 320 may be formed over the active layer, such that the source electrode 318 may extend from the data line 322, and the drain electrode 320 may connect to an extension 324 over the common line 306. Further, a drain contact hole 330 may be formed exposing a portion of the extension 324.

An insulating layer (not shown) may be disposed between the extension 324 and the common line 306 thereby forming a storage capacitor $C_{ST}$. The extension 324 may function as a first storage electrode of the storage capacitor $C_{ST}$ and the common line 306 may function as a second storage electrode of the storage capacitor.

In addition, a pixel electrode 334 and a common electrode may be formed within the pixel region P on the array substrate 300. The pixel electrode 334 may electrically connect to the drain electrode 320 via the extension 324, and may include portions vertically extended in the pixel region P. The common electrode may include at least a horizontal portion 336a and a plurality vertical portions 336b, which may be electrically connected to the common line 306 and extend vertically from the horizontal portion 336a. In particular, the vertical portions of the pixel electrode 334 may interpose between the vertical portions 336b of the common electrode.

Further, an auxiliary electrode 308 may be formed on the array substrate 300. The auxiliary electrode 308 may vertically extend from the common line 306 and locate between the data line 322 and the vertical portion 336b' of the common electrode immediately adjacent to the data line 322. In addition, the auxiliary electrode 308 may include first and second extensions 310a and 310b extended from upper and lower portions of the auxiliary electrode 308 and overlapped with portions of the data line 322.

Accordingly, if a malfunction occurs in the data line 322, e.g., a breakage at a portion F of the data line 322, the first and second extensions 310a and 310b may be welded to connect the date line 322 at portions G and H. In addition, portions I and J of the vertical portion 336b ' of the common electrode immediately adjacent to the data line 322 may be cut, such that the vertical portion 336b ' of the common electrode immediately adjacent to the data line 322 may become a repair line and function as the data line 322. Moreover, during a normal operation, e.g., no breakage at the data line 322, the auxiliary electrode 308 may protect liquid crystal molecules near the data line 322 from being affected by signals of the data line 322. The auxiliary electrode 308 may be formed at only one side of the data line 322 or at both sides of the data line 322.

Figure 7A:
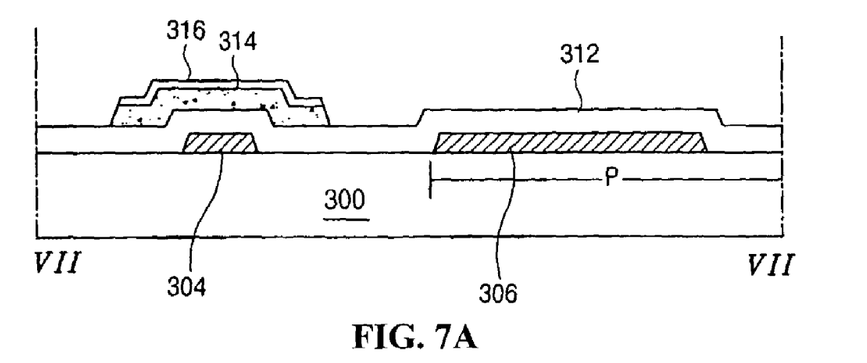
FIGS. 7A to 7C are cross-sectional views of the exemplary array substrate in FIG. 6 along VII—VII' according to the present invention.
Figure 7B:
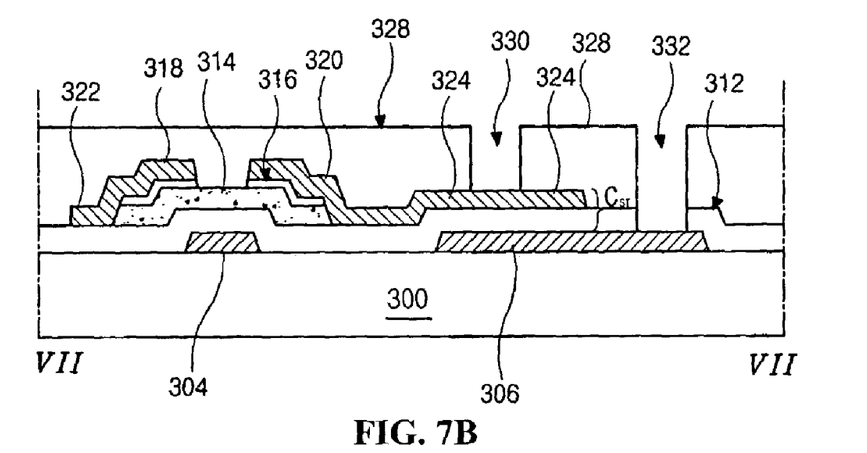
Figure 7C:
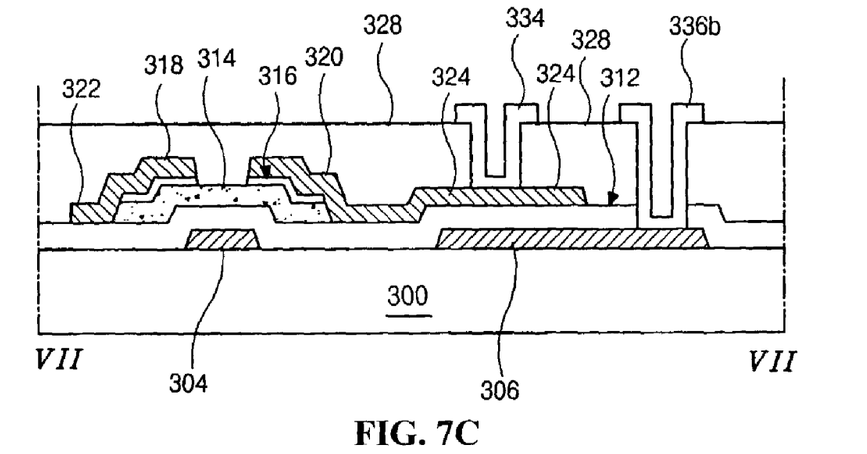
Figure 8A:
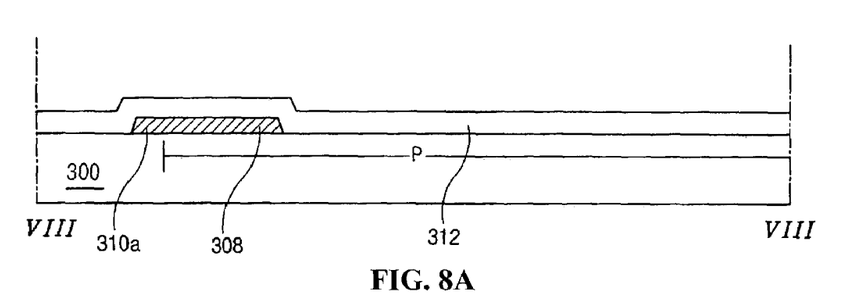
FIGS. 8A to 8C are cross-sectional views of the exemplary array substrate in FIG. 6 along VIII—VIII' according to the present invention.
Figure 8B:
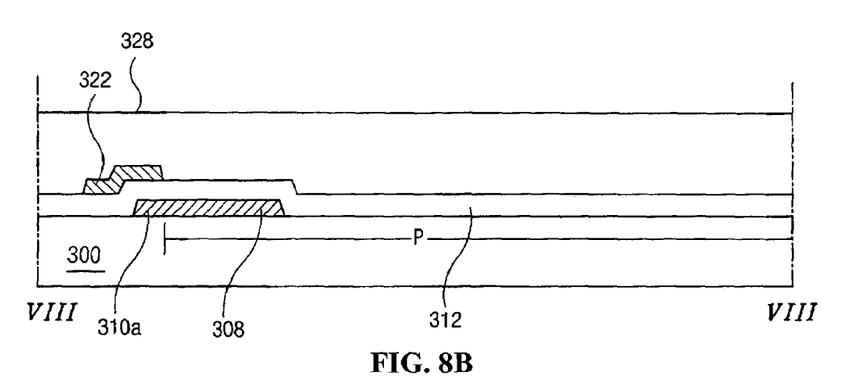
Figure 8C:
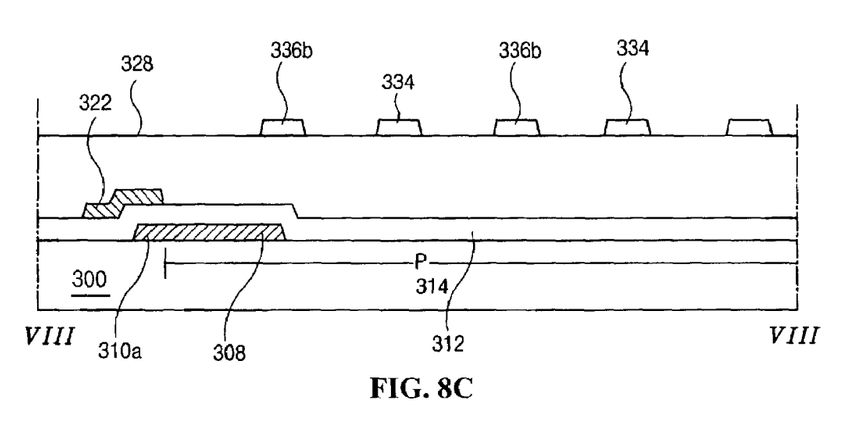

FIGS. 7A to 7C are cross-sectional views of the exemplary array substrate in FIG. 6 along VII—VII' according to the present invention, and FIGS. 8A to 8C are cross-sectional views of the exemplary array substrate in FIG. 6 along VIII—VIII' according to the present invention. In FIGS. 7A and 8A, a first conductive material layer may be deposited on the array substrate 300. The first conductive material layer may include one of aluminum (Al), aluminum alloys (AlNd), chromium (Cr), tungsten (W), molybdenum (Mo), and tantalum (Ta). In addition, the first conductive material layer may be patterned to simultaneously or sequentially form at least the gate electrode 304, the common line 306, and the auxiliary electrode 308. The auxiliary electrode 308 may vertically extend from the common line 306 near the data line 322 (in FIG. 6). Also, the auxiliary electrode 308 may be formed at one side of the data line 322 or at both sides of the data line 322, and may include first and second extensions 310a and 310b (in FIG. 6). If the auxiliary electrode 308 is formed at both sides of the data line 322, the first and second extensions 310a and 310b would cross over the data line 322.

As shown in FIG. 7A, a gate insulating layer 312 may be formed on the array substrate 300 covering at least the gate electrode 304, the common line 306, and the auxiliary electrode 308. The gate insulating layer 312 may be formed by depositing an inorganic insulating material on the array substrate 300, and the inorganic insulating material may include one of silicon nitride (SiNx) and silicon oxide (SiO$_2$). Also the active layer 314 and an ohmic contact layer 316 may be formed on the gate insulating layer 312 directly above the gate electrode 304 by sequentially depositing amorphous silicon (a-Si:H) and impurity-doped amorphous silicon (n$^+$a-Si:H) on the gate insulating layer 312 and then patterning the deposited silicon material.

In FIGS. 7B and 8B, a second conductive material layer may be deposited on the array substrate 300. The second conductive material layer may include on of aluminum (Al), aluminum alloys (AlNd), chromium (Cr), tungsten (W), molybdenum (Mo), and tantalum (Ta). The second conductive material layer may include the same material as the first conductive material layer. In addition, the second conductive material layer may be patterned to simultaneously or sequentially form at least the data line 322, the source electrode 318, the drain electrode 320 spaced apart from the source electrode 318 and the extension 324 extended from the drain electrode 320 to cover the common line 306. The source and drain electrodes 318 and 320 may be spaced apart from each other on the ohmic contact layer 316, and a portion of the ohmic contact layer 316 may also be etched to expose a portion of the active layer 314. Further, the source electrode 318 may extend from the data line 322, and the extension 324 may extend from the drain electrode 320 cover a portion of the common line 306, such that the extension 324, the common line 306, and the gate insulating layer 312 disposed therebetween may form the storage capacitor $C_{ST}$.

Further, the data line 322 may cross the first extension 310a and the second extension 310b (in FIG. 6). In addition, a passivation layer 328 may be formed on the array substrate 300 covering at least the data line 322, the source and drain electrodes 318 and 320, the exposed portion of the active layer 314, and the extension 324. The passivation layer 328 may function as a second insulating layer of the array substrate 300. Moreover, the passivation layer 328 may be formed by depositing or coating an organic insulating material on the array substrate 300, and the organic insulating material may include one of benzocyclobutene (BCB) and acrylic resin. Then, portions of the passivation layer 328 may be patterned to form the drain contact hole 330 exposing a portion of the extension 324 and the common line contact hole 332 exposing a portion of the common line 306.

In FIG. 7C, a transparent conductive material layer may be deposited on the array substrate 300. The transparent conductive material layer may include one of indium tin oxide (ITO) and indium zinc oxide (IZO). In addition, the transparent conductive material layer may be patterned to form the pixel electrode 334 and the common electrode including the horizontal portion 336a and the vertical portions 336b. In particular, the pixel electrode 334 may include portions vertically extending in the pixel region P, and the vertical portions of the pixel electrode 334 may interpose between the vertical portions 336b of the common electrode. Further, the pixel electrode may connect to the extension 324 via the drain contact hole 330. Also, one of the vertical portions 336b of the common electrode may contact the common line 306 via the common line contact hole 332, such that the common electrode may receive signals of the common line 306.

It will be apparent to those skilled in the art that various modifications and variations can be made in the array substrate for in-plane switching mode liquid crystal display device and the method for fabricating the same of the present invention covers the modifications and variations of this invention provided they come within the scope of the appended claims and their equivalents.

What is claimed is:

1. An array substrate device for a liquid crystal display device, comprising:
    a substrate;
    a gate line extending along a first direction on the substrate;
    a data line extending along a second direction substantially perpendicular to the first direction on the substrate;
    a pixel region defined by a crossing of the gate and data lines;
    a common line extending along the first direction and spaced apart from the gate line;
    a common electrode having a plurality of first portions extended along the second direction from the common line to the pixel region and a second portion extending in the first direction and connecting to the plurality of first portions, wherein one of the first portions of the common electrode adjacent to the data line includes first and second extensions overlapping portions of the data line;
    a thin film transistor on the substrate at a crossing portion of the gate and data lines, the thin film transistor including source and drain electrodes;
    a pixel electrode extended from the drain electrode to the pixel region; and
    an auxiliary electrode extending along the second direction and connected to the one of the first portions of the common electrode adjacent to the data line.

2. The device according to claim 1, wherein the common line, the common electrode, and the gate line include a same conductive material.

3. The device according to claim 2, wherein the thin film transistor further includes a gate electrode and an active layer, such that the gate electrode includes the same conductive material as the common line, the common electrode, and the gate line.

4. The device according to claim 1, wherein the pixel electrode and the data line include a same conductive material.

5. The device according to claim 1, wherein the pixel electrode includes:
    a first portion extending in the first direction and extending from the drain electrode; and
    a plurality of second portions extending in the second direction and interposing between the first portions of the common electrode.

6. The device according to claim 5, further comprising a storage capacitor, wherein the first portion of the pixel electrode functions as a first storage electrode of the storage capacitor, and the second portion of the common electrode functions as a second storage electrode of the storage capacitor.

7. The device according to claim 1, wherein the one of the first portions of the common electrode having the first and second extensions functions as a repair line for the data line and the auxiliary electrode functions as the common electrode.

8. The device according to claim 1, wherein the auxiliary electrode is formed at only one side of the data line.

9. The device according to claim 1, wherein the auxiliary electrode is formed at both sides of the data line, and the one of the first portions of the common electrode including the first and second extensions is formed at the both sides of the data line.

10. The device according to claim 9, wherein the first extensions at the both sides of the data line interconnect to each other, and the second extensions at the both sides of the data line interconnect to each other.

11. A method for fabricating an array substrate for a liquid crystal display device, comprising:
    forming a gate line extending along a first direction on a substrate;
    forming a data line extending along a second direction on the substrate, thereby defining a pixel region by a crossing of the gate and data lines;
    forming a common line extending along the first direction and spaced apart from the gate line;
    forming a common electrode having a plurality of first portions extended along the second direction from the common line to the pixel region and a second portion extended in the first direction and connected to the plurality of first portions, wherein one of the first portions of the common electrode adjacent to the data line includes first and second extensions overlapping portions of the data line;
    forming a thin film transistor on the substrate at a crossing portion of the gate and data lines, wherein the thin film transistor includes source and drain electrodes;
    forming a pixel electrode extended from the drain electrode to the pixel region; and
    forming an auxiliary electrode that extends along the second drain direction and connects to the one of the first portions of the common electrode adjacent to the data line.

12. The method according to claim 11, wherein the common line, the common electrode, and the gate line include a same conductive material.

13. The method according to claim 12, wherein the forming a thin film transistor further includes forming a gate electrode and an active layer, such that the gate electrode includes the same conductive material as the common line, the common electrode and the gate line.

14. The method according to claim 11, wherein the pixel electrode and the data line include a same conductive material.

15. The method according to claim 11, wherein the forming a pixel electrode includes:
    forming a first portion extended in the first direction and extending from the drain electrode; and
    forming a plurality of second portions extended in the second direction and interposed between the first portions of the common electrode.

16. The method according to claim 11, wherein the forming an auxiliary electrode includes forming the auxiliary electrode at only one side of the data line.

17. The method according to claim 11, wherein the forming an auxiliary electrode includes forming the auxiliary electrode at both sides of the data line, and wherein the forming a common electrode includes forming the one of the first portions of the common electrode including the first and second extensions at both sides of the data line.

18. The method according to claim 17, further comprising: interconnecting the first extensions at the both sides of the data lines; and interconnecting the second extensions at the both sides of the data lines.

19. The method according to claim 11, further comprising:
connecting the first and second extensions to the data line; and
cutting upper and lower portions of the one of the first portions of the common electrode having the first and second extensions.

20. An array substrate device for a liquid crystal display device, comprising:
a substrate;
a gate line extending along a first direction on the substrate;
a data line extending along a second direction substantially perpendicular to the first direction on the substrate;
a pixel region defined by a crossing of the gate and data lines;
a common line extending along the first direction and spaced apart from the gate line;
a common electrode having a plurality of first portions extended along the second direction from the common line to the pixel region;
a thin film transistor on the substrate at a crossing portion of the gate and data lines, the thin film transistor including source and drain electrodes;
a pixel electrode on the substrate extended from the drain electrode to the pixel region; and
an auxiliary electrode extended from the common line along the second direction to a space between the data line and one of the first portions of the common electrode adjacent to the data line, the auxiliary electrode having first and second extensions crossing the data line.

21. The device according to claim 20, wherein the common electrode and the pixel electrode include a same material.

22. The device according to claim 20, further comprising an extension extended from the drain electrode and disposed over the common line.

23. The device according to claim 22, further comprising a storage capacitor, wherein the extension functions as a first storage electrode of the storage capacitor, and the common line functions as a second storage electrode of the storage capacitor.

24. The device according to claim 20, wherein the auxiliary electrode having the first and second extensions serves as a repair line for the data line.

25. The device according to claim 20, wherein the auxiliary electrode is formed at only one side of the data line.

26. The device according to claim 20, wherein the auxiliary electrode is formed at both sides of the data line.

27. The device according to claim 26, wherein the first and second extensions of the auxiliary electrode at one side of the data line are respectively connected to the first and second extensions of the auxiliary electrode at the other side of the data line.

28. A method for fabricating an array substrate for a liquid crystal display device, comprising:
forming a gate line extending along a first direction on a substrate;
forming a data line extending along a second direction on the substrate, thereby defining a pixel region by a crossing of the gate and data lines;
forming a common line extending along the first direction and spaced apart from the gate line;
forming a common electrode having a plurality of portions extended from the common line to the pixel region;
forming a thin film transistor at a crossing portion of the gate and data lines; forming a pixel electrode extended from the drain electrode to the pixel region; and
forming an auxiliary electrode extended from the common line along the second direction to a space between the data line and one of the portions of the common electrode adjacent to the data line, the auxiliary electrode having first and second extensions crossing the data line.

29. The method according to claim 28, wherein the thin film transistor has a gate electrode, an active layer, a source electrode and a drain electrode.

30. The method according to claim 28, wherein the forming a common electrode and forming a pixel electrode include forming a transparent conductive material layer on the substrate and patterning the transparent conductive material layer to form the common electrode and the pixel electrode, the transparent conductive material layer including one of indium tin oxide (ITO) and indium zinc oxide (IZO).

31. The method according to claim 28, wherein the pixel electrode has a plurality of vertical portions extended from the drain electrode, and wherein the common electrode has a plurality of vertical portions being spaced apart from the vertical portions of the pixel electrode and a horizontal portion connecting the plurality of vertical portions into one.

32. The method according to claim 31, further comprising forming an extension extended from the drain electrode and disposed over the common line.

33. The method according to claim 28, wherein the forming an auxiliary electrode includes forming the auxiliary electrode at only one side of the data line.

34. The method according to claim 28, wherein the forming an auxiliary electrode includes forming the auxiliary electrode at both sides of the data line.

35. The method according to claim 34, wherein the first and second extensions of the auxiliary electrode at one side of the data line are respectively connected to the first and second extensions of the auxiliary electrode at the other side of the data line.

36. The method according to claim 28, further comprising: connecting the first and second extensions to the data line; and
cutting upper and lower portions of the auxiliary electrode having the first and second extensions.

37. An array substrate device for a liquid crystal display device, comprising:
a substrate;
a gate line extending along a first direction on the substrate;
a data line extending along a second direction substantially perpendicular to the first direction on the substrate;
a pixel region defined by a crossing of the gate and data lines;

a common line extending along the first direction and spaced apart from the gate line;

a pixel electrode connected to the drain electrode and extending along the second direction;

a common electrode connected to the common line and including first and second portions extending along the second direction, wherein the first and second portions are disposed between the data line and the pixel electrode and at different layers from each other, wherein the first portion is disposed between the second portion and the data line and includes first and second extensions overlapping portions of the data line; and a thin film transistor on the substrate at a crossing portion of the gate and data lines, the, thin film transistor including source and drain electrodes.

38. The device according to claim 37, wherein the first and second portions overlap each other.

39. The device according to claim 37, wherein the first portion is extended from the common line.

40. The device according to claim 39, further comprising an insulating layer disposed between the first and second portions and having a contact hole, wherein the second portion is connected to the common line through the contact hole.

41. The device according to claim 40, wherein the insulating layer includes first and second insulating layers, wherein the first insulating layer is disposed between the first portion and the pixel electrode, and the second insulating layer is disposed between the pixel electrode and the second portion.

42. The device according to claim 40, wherein the insulating layer includes first and second insulating layers, wherein the first insulating layer is disposed between the first portion and the data line, and the second insulating layer is disposed between the data line and the second portion.

43. The device according to claim 42, wherein the pixel electrode and the second portion are disposed at the same layer.

* * * * *